J. D. ROWLAND.
Firemen's Extension Ladder.
No. 165,618.                                     Patented July 13, 1875.
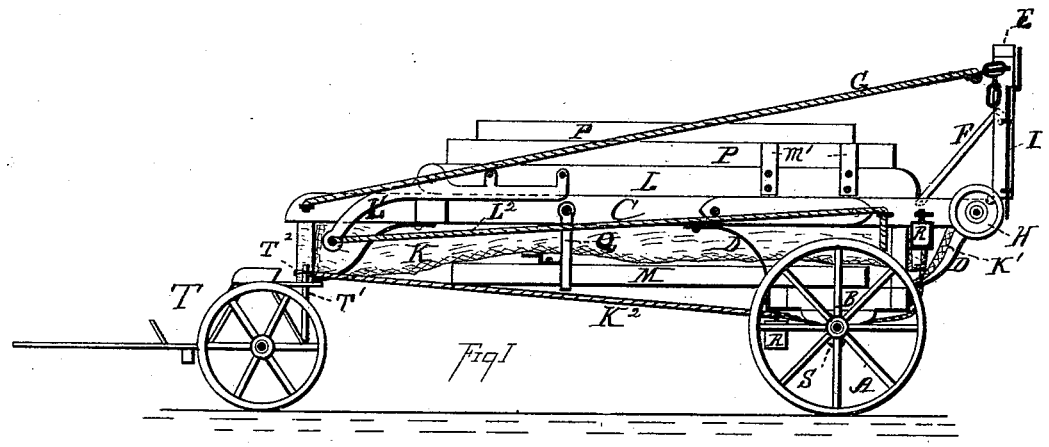
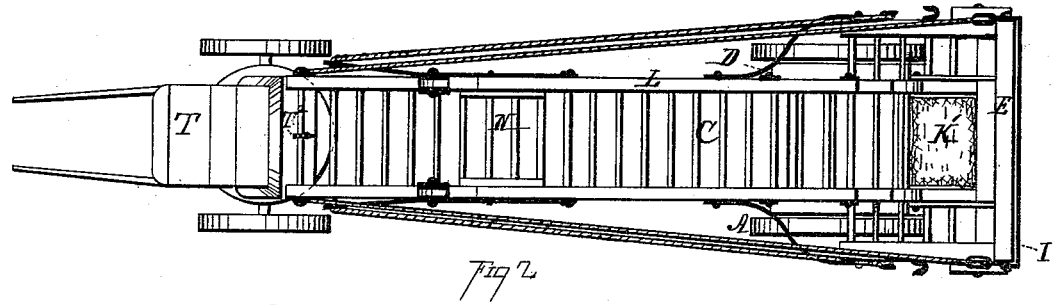
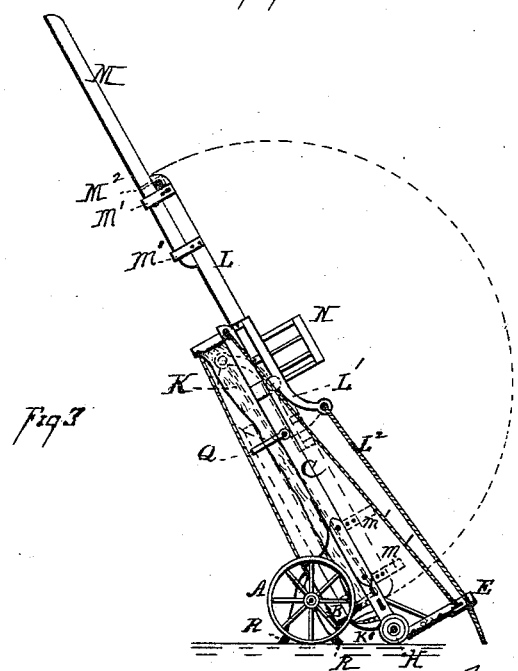

UNITED STATES PATENT OFFICE.

JAMES D. ROWLAND, OF CLEVELAND, OHIO, ASSIGNOR OF ONE-HALF HIS RIGHT TO HENRY HAMLEY, OF SAME PLACE.

IMPROVEMENT IN FIREMEN'S EXTENSION-LADDERS.

Specification forming part of Letters Patent No. 165,618, dated July 13, 1875; application filed June 3, 1875.

*To all whom it may concern:*

Be it known that I, JAMES D. ROWLAND, of Cleveland, in the county of Cuyahoga and State of Ohio, have invented certain new and useful Improvements in Combined Fire-Escape and Ladder; and I do hereby declare the following to be a full, clear, and exact description of the invention, such as will enable others skilled in the art to which it pertains, to make and use it, reference being had to the accompanying drawings, which form part of this specification.

My invention relates to an improvement in fire-escapes and fire-ladders, and consists in a two-wheeled truck, upon which is poised an extension-ladder, and with or without a forward truck to assist in transporting the device. The ladder is composed of a base-section, to which is attached a tubular fire-escape, and a second section attached by a pivot to the base-section, and capable of being raised by a peculiar lever arrangement, and upper section which can be shipped to the second section at will, all as hereinafter more fully set forth and claimed.

In the drawings, Figure 1 is a side elevation of a ladder and fire escape, embodying my improvement. Fig. 2 is a plan view of same. Fig. 3 represents the ladder detached from the front truck, and representing the device elevated ready for use, with an extra length of ladder attached to the second section.

A is a suitable two-wheel truck, made in any desirable and substantial form. To the truck A is poised a suitable frame-work, B, which frame-work is the foundation to which the ladders are attached. C is the base-section of the ladder. It is made, as shown, to extend from the front back beyond the axle of the truck A, and is firmly secured to the frame-work B by suitable and substantial braces D. E is a portion of the base-section, C. It is hinged to the portion C, and, when the latter is not in use, may be folded down upon the section C by releasing the hooks F, though, instead of hooks F, any other suitable form of brace may be employed. When the hooks or braces F are adjusted in position the portion E forms a stiff rigid connection for the stay-ropes G. H are wheels attached at the end of the base-section C in any suitable manner, either upon an axle extending across the machine, or by direct attachment to the said base-section C, the object being to facilitate moving the ladder about when it is in a raised position. When the base-section C is tilted back around the axle of the truck A, as shown in Fig. 3, the wheels H will rest upon the ground. If, however, the inclination required for the ladder will not permit the wheels H to rest upon the ground, then a sliding frame, I, may be dropped down, and thus form a support against the ground for the said base-section. This sliding frame I is adjusted to be raised or lowered at will, and secured rigidly in any given position. K is a tube of canvass, which extends from the top of the base section to the bottom of same beneath, and at the bottom is a spring or cushion-work, $K^1$, and an opening which leads out of a space left at the bottom of the ladder C; this serves as a fire-escape. A person dropped into the top of the said canvass tube K will land safely upon the cushion or spring-work $K^1$, and be removed through the open space. $K^2$ are stay-rods or ropes extending from the underneath portion of the upper end of the tube K to the bed B, to which they are securely fastened, and with the stays G form a very rigid and stiff connection and support for the base-section C. L is the second section of the ladder. It is hinged to the section C near its upper end, as, for instance, at $C^1$. A lever, $L^1$, attached thereto, and projecting beyond the said hinged end, serves to raise the ladder through the medium of the cords $L^2$, which extend down to the bottom of the ladder within reach of the firemen. The base-section C of the ladder may be made of sufficient length to reach into the third story of an ordinary dwelling, and it will not, therefore, be necessary generally to use more than the base-section C, but when an emergency requires that other stories above shall be reached, then it is necessary to employ the second section L. The first section C being tilted into the position in Fig. 3, the second section L can be instantly raised by drawing upon the cords $L^2$, which cords may be fastened to the top of the frame E, or to any other suitable point, whereby the said ladder is prevented from tilting back.

If it is desired to reach a point beyond the top of the second section, it is readily done by attaching to the second section a third section, M. This section is slid in between the clutches $M^1$ until the grapples $M^2$ engage upon the top roller or rung of the ladder L. When the section L is about to be raised, the operators having hold of the cords $L^2$ should stand immediately beneath the lever $L^1$, and as the ladder is raised they pass back to the frame E, and make fast the ropes $L^2$ to the said frame. A door or trap, N, is fixed in the ladder L near its base, so that if a person is removed from a window above he may be taken down, passed through the trap N into the tube K. As the device stands in Fig. 1, there may be two or more extra lengths of ladder, P P, carried upon the top of the machine, and the extra length M carried beneath the machine, supported by suitable straps or framework Q, and with its base resting on the bed B. R are four blocks, two for each wheel. They are attached by suitable cords or chains to the frame B, or the axle of the truck A, and when not in use are hooked up out of the way. The object of the blocks is to chuck the wheels both front and rear, when the device is in use. S is a hook or hooks, to which may be attached a bucket or buckets with single lengths of hose and hand-pumps, for immediate use in case of emergency, or instead thereof there may be attached to the said hooks S any other suitable hand apparatus, such as a chemical fire-extinguisher.

It will be noticed that the base-section C is spread out laterally. This effects a twofold purpose: It permits the firemen to ascend the ladder to a point above the opening at the base of the canvas tube K; at the same time it adds weight to that end of the base-section, whereby the structure is rendered more easily portable and more stable when in use.

This device can be readily operated by two or more men as a hand-truck by simply tilting the ladder back until is equally poised upon the axle of the truck A. It may be then pushed along as a car would be pushed.

In order that the device may, if desired, be adapted to be drawn by horses a front truck or carriage, T, is provided. This truck may be arranged to carry two men and a driver, or more, if desired, though two men will generally be sufficient to raise and operate the ladder. A pin, $T^1$, serves to secure the fore end of the ladder to the truck T, and the pin $T^2$ may prevent uncoupling.

In order that the second section L of the ladder may be readily unshipped if it should be required for separate use, I prefer to attach it to the base-section C, or to the lever $L^1$, by removable fastenings W, such as thumb-screws, for instance.

It will be observed that the trucks T, being fastened simply by a pivot, $T^1$, to the ladder, will permit the truck to move around and turn in any direction, and the ladder is so nearly poised on the truck A that one man may readily lift it off from the pivot $T^1$.

Having thus described my invention, what I claim as new, and desire to secure by Letters Patent, is—

1. In a fire-escape, the combination, with the base-section C and frame E, of the adjustable support I, substantially as and for the purpose described.

2. The combination, with the two-wheeled truck A, support B, and base-section C, of the second section L, hinged thereto, and cords $L^2$, substantially as for the purpose described.

3. The combination, with the two-wheel truck A and the base-section C, of the extra length M, suspended beneath the said base-section, substantially as and for the purpose described.

4. The combination, with the hinged second section L, lever $L^1$, and cord $L^2$, of the extra length M, the clutches $M^1$, and grapples $M^2$, substantially as and for the purpose described.

In testimony whereof I have signed my name to this specification in the presence of two subscribing witnesses.

JAMES D. ROWLAND.

Witnesses:
H. T. HOWER,
FRANCIS TOUMEY.